United States Patent
Topaloglu

(10) Patent No.: US 10,394,992 B2
(45) Date of Patent: Aug. 27, 2019

(54) WIRE LINEEND TO VIA OVERLAP OPTIMIZATION

(71) Applicant: International Business Machines Corporation, Armonk, NY (US)

(72) Inventor: Rasit O. Topaloglu, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 15/805,178

(22) Filed: Nov. 7, 2017

(65) Prior Publication Data

US 2019/0138681 A1 May 9, 2019

(51) Int. Cl.
*G06F 17/50* (2006.01)
*G03F 1/36* (2012.01)

(52) U.S. Cl.
CPC ............ *G06F 17/5068* (2013.01); *G03F 1/36* (2013.01); *G06F 2217/02* (2013.01)

(58) Field of Classification Search
CPC ............................... G06F 17/5068; G03F 1/36
USPC ............................................... 716/50, 54, 55
See application file for complete search history.

(56) References Cited

U.S. PATENT DOCUMENTS

| | | | |
|---|---|---|---|
| 7,571,416 B2 | 8/2009 | Watanabe | |
| 7,930,667 B2 | 4/2011 | Bergman Reuter et al. | |
| 8,448,102 B2 * | 5/2013 | Kornachuk et al. | ......................... G06F 17/5068 716/55 |
| 8,839,168 B2 | 9/2014 | Kye et al. | |
| 9,204,538 B2 | 12/2015 | Lee et al. | |
| 9,418,935 B1 | 8/2016 | Shao et al. | |
| 9,519,745 B2 | 12/2016 | Yuan et al. | |
| 9,548,243 B1 | 1/2017 | Briggs et al. | |
| 9,754,878 B2 * | 9/2017 | Kornachuk et al. | ......................... G06F 17/5068 |

OTHER PUBLICATIONS

Abercrombie et al, "Fill/Cut Self-Aligned Double-Patterning", Semiconductorengineering, Nov. 17, 2016, 14 pages.
Pan et al., "Pushing multiple patterning in sub-10nm: are we ready?" 52nd Annual Design Automation Conference, 2015, pp. 197-202.

(Continued)

*Primary Examiner* — Sun J Lin
(74) *Attorney, Agent, or Firm* — Monchai Chuaychoo

(57) ABSTRACT

An approach for shifting a cut associated with a lineend of an interconnect in a manufacturing system. The approach selects one or more polygons associated with the lineend and determines whether a first cut is spanning the one or more polygons. The approach responds to the first cut does span, determines a presence of a first via on a first interconnect and determines a first distance of the first via to the first cut. The approach determines whether the first distance is greater than a first threshold and responds to the first distance is greater and determines whether the first distance is greater and determines a second distance of the first cut to a second cut. The approach determines whether the second distance is greater than a second threshold and responds to the second distance is greater and generates a shift associated with the first cut and outputs the shift.

20 Claims, 9 Drawing Sheets

(56) References Cited

OTHER PUBLICATIONS

Xu et al., "Self-aligned double patterning aware pin access and standard cell layout co-optimization," IEEE Transactions on Computer-Aided Design of Integrated Circuits and Systems, vol. 34, No. 5, 2015. pp. 699-712.

Yu et al., "Bridging the gap from mask to physical design for multiple patterning lithography," Proc. of SPIE, vol. 9053, 905308, 2014, 11 pages.

* cited by examiner

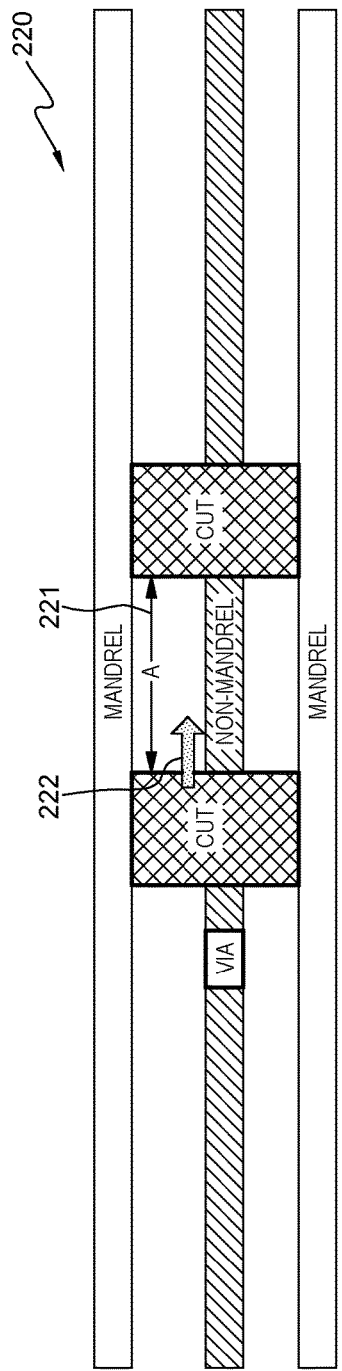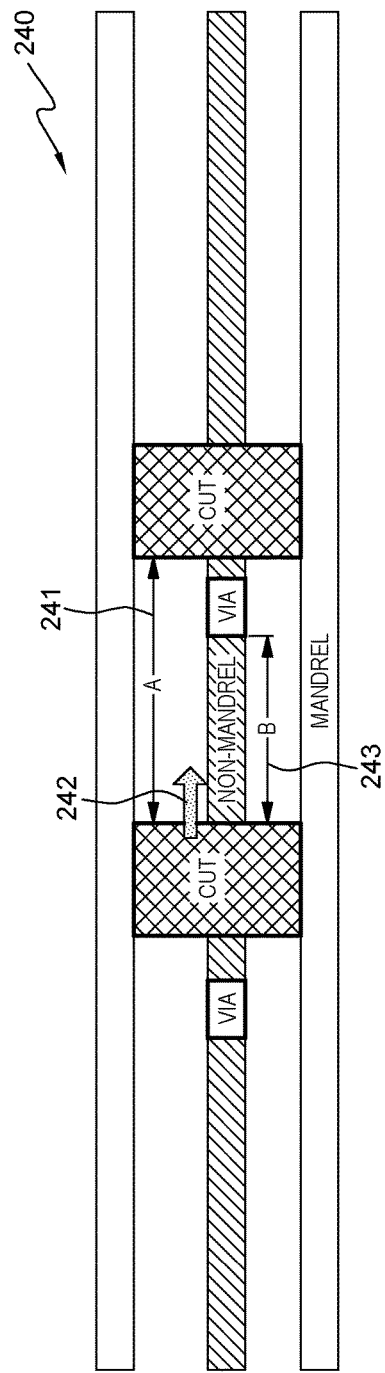

WIRE LINEEND TO VIA OVERLAP OPTIMIZATION

BACKGROUND OF THE INVENTION

The present invention relates generally to the field of semiconductor manufacturing and more particularly to optimizing circuit design.

Multiple patterning (or multi-patterning) is a class of technologies for manufacturing integrated circuits (ICs), developed for photolithography to enhance the feature density. There are several types of multiple patterning techniques including self-aligned double patterning (SADP), Litho-Etch-Litho-Etch (LELE) and self-aligned quadruple patterning (SAQP) methods.

Multiple patterning entails the use of many processing steps to form a patterned layer, where conventionally, single patterning, only one lithographic exposure, one etch sequence and one deposition sequence would be adequate. The premise is that a single lithographic exposure may not be enough to provide sufficient resolution. Therefore, additional exposures would be needed, or otherwise, the positioning patterns using etched feature sidewalls (using spacers) would be necessary.

Multi-patterning technology has its own process and design trade-offs. Specifically, designs with moving from one technology node to another bears the increase in cost against the improvements in area and performance. Without multi-patterning, IC designers struggle to design at 14 nm feature size or below, which limits the opportunity to take advantage of design area and performance scaling. Multi-patterning affects almost all aspects of design and manufacturing. For example, in physical design it adds additional design rule constraints and constrains cell placement and routing depending on cell architecture. In another example, for electrical design it adds additional parasitic variability to consider in timing analysis. In a further example, for design for manufacturability (DFM), it adds additional requirements for fill and lithographic checking. In manufacturing, it adds additional masks, process steps and increases stepper utilization. All of these trade-offs increase complexity and have higher associated cost.

Furthermore, additional optimization in SADP may require scrutiny in the physical design tools in order to access Standard Cell (SC) Input/Output (I/O) pins within a more congested areas. However, there are complex design rules that restricts human-driven layout design from achieving better yield and throughput. Hence, a means to automate a standard cell layout design is required for 14 nm technologies and below. SADP, in particular, is an ideal candidate for lower layer metallization with regular patterns at the 10 nm technology node, due to ideal overlay and Line Edge Roughness (LER) control compared to LELE. Some circuit design systems have additional but redundant vias to enhance manufacturing yields wherein yield is a statistical quantity defining number of operational chips over the whole ensemble. However, these poorly located vias may be too close to an interconnect which may lead to electrical shorting through via bleeding, i.e., a laterally elongated via touching a neighboring interconnect, or electrical opens in the form of via voiding, i.e., a partially filled via that does not conduct well and is highly resistive. These usually can be fixed by extending lineends beyond a via, thus increasing lineend to via overlap distance. In another example, some designs may contain complex cuts for polygon and lineend that are counterproductive during the manufacturing process. Below are some definitions that will be utilized throughout an embodiment of the present invention.

A polygon is a layer consisting of pre-determined patterns with a pre-defined number of vertices. A lineend or line-end is the end point of the target "line" that can be defined by a cut. An interconnect is conductor (typically metal) line connecting elements of an integrated circuit. A via is a vertical electrical connection. A cut or cutmask is a mask to define lineends.

Accordingly, there exists a need to implement a better circuit DFM optimization within 14 nm technologies and beyond. In particular, the disclosed embodiment of the present invention targets lineend to via overlap optimization.

SUMMARY

According to an embodiment of the present invention, computer-implemented method for shifting a cut associated with a lineend of an interconnect in an advanced manufacturing system, the method comprising: selecting, by one or more computer processors, one or more polygons associated with a lineend; determining, by the one or more computer processors, whether a first cut is spanning the one or more polygons; responsive to determining the first cut does span the one or more polygons, determining, by the one or more computer processors, a presence of a first via on a first interconnect; responsive to the presence of the first via on the first interconnect, determining, by the one or more computer processors, a first distance of the first via to the first cut; determining, by the one or more computer processors, whether the first distance is greater than a first pre-determined threshold; responsive to the first distance is greater than the first pre-determined threshold, determining, by the one or more computer processors, a second distance of the first cut to a second cut; determining, by the one or more computer processors, whether the second distance is greater than the second pre-determined threshold; responsive to determining the second distance is greater than the second pre-determined threshold, generating, by the one or more computer processors, a shift associated with the first cut; and outputting, by the one or more computer processors, the shift for moving the first cut.

BRIEF DESCRIPTION OF THE DRAWINGS

FIG. 2B-C is a graphical example, illustrating the operational steps of a method for single cut component 112 of FIG. 1B in accordance with an embodiment of the present invention;

DETAILED DESCRIPTION

Embodiments of the present invention recognize that improvements such as yield and throughput to the multi-patterning circuit design techniques may be made by using a method and system to assist in the design and manufacturing process to address 14 nm technologies and beyond. This improvement lies in the invention's ability to identify, beyond a cut defining a given lineend, the type of a first neighboring interconnect on the tip direction, via locations on such first neighboring interconnect, and the cuts defining lineend of a second neighboring interconnect. Based on determining the information associated with the cuts, vias and interconnection location, the invention can determine how and where to shift one or more cuts for a given lineend (effectively extending lineend of several interconnects beyond the via that is enclosed) or shift cuts spanning multiple lineends associated with a circuit layout. However, optimization employing more than two cuts are more computationally challenging as the two cuts (double cut) need to be shifted at once. Implementation of embodiments of the invention can take a variety of forms, and exemplary implementation details are discussed subsequently with reference to the Figures.

Figure 1A:
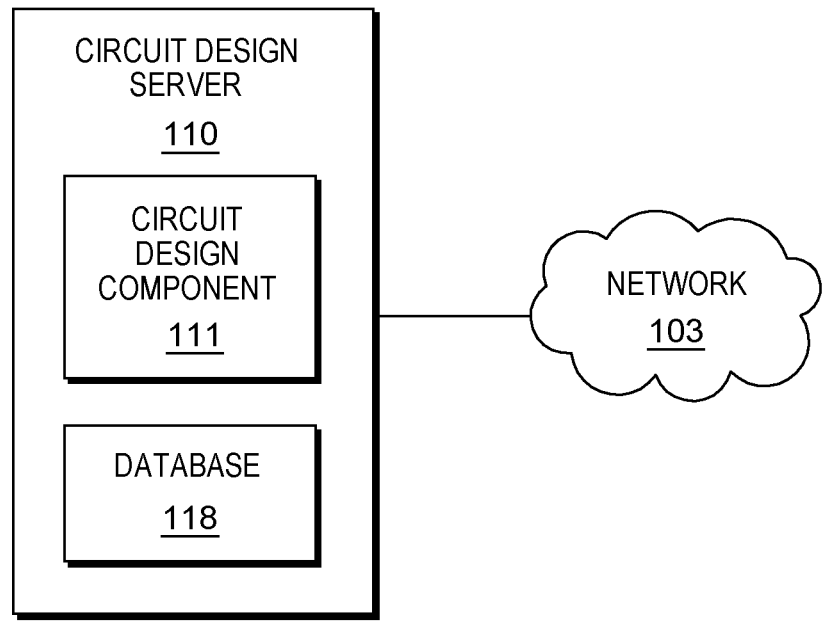
FIG. 1A is a functional block diagram illustrating circuit design data processing environment, in accordance with an embodiment of the present invention.

FIG. 1A is a functional block diagram illustrating an adaptive wire lineend optimization data processing environment in accordance with one embodiment of the present invention. FIG. 1A provides only an illustration of one implementation and does not imply any limitations with regards to the environments in which different embodiments may be implemented. Many modifications to the depicted environment may be made by those skilled in the art without departing from the scope of the invention as recited by the claims.

Wire lineend optimization data processing environment includes circuit design server 110 and client computing device 120, all interconnected over network 103. Network 103 can be, for example, a telecommunications network, a local area network (LAN), a wide area network (WAN), such as the Internet, or a combination of the three, and can include wired, wireless, or fiber optic connections. Network 103 can include one or more wired and/or wireless networks that are capable of receiving and transmitting data, voice, and/or video signals, including multimedia signals that include voice, data, and video information. In general, network 103 can be any combination of connections and protocols that will support communications between circuit design server 110, client computing device 120, and other computing devices (not shown) within wire lineend optimization data processing environment.

Circuit design server 110 can be a standalone computing device, a management server, a web server, a mobile computing device, or any other electronic device or computing system capable of receiving, sending, and processing data. In other embodiments, circuit design server 110 can represent a server computing system utilizing multiple computers as a server system, such as in a cloud computing environment. In another embodiment, circuit design server 110 can be a laptop computer, a tablet computer, a netbook computer, a personal computer (PC), a desktop computer, a personal digital assistant (PDA), a smart phone, or any other programmable electronic device capable of communicating with client computing device 120, and other computing devices (not shown) within wire lineend optimization data processing environment via network 103. In another embodiment, circuit design server 110 represents a computing system utilizing clustered computers and components (e.g., database server computers, application server computers, etc.) that act as a single pool of seamless resources when accessed within wire lineend optimization data processing environment. Circuit design server 110 includes circuit design component 111 and database 118.

Circuit design component 111 enables circuit designer to optimize lineends in multi-patterning techniques. In the depicted embodiment, circuit design component 111 resides on circuit design server 110. In another embodiment, circuit design component 111 can reside on client computing device 120.

In the embodiment of the present invention, circuit design component 111 allows the circuit designer to manufacture a circuit chip based on the output (e.g., cut mask, etc.) from the optimization method and system. For example, after completing the circuit design using circuit design component 111, the output circuit design can be directly manufactured using known techniques in the art (e.g., wafer deposition, etc.) into an integrated circuit (IC) or semiconductor chip. Furthermore, the optimized IC chip can be made effectively to address the current constraints with the given 14 nm process limitation.

Database 118 is a repository for data used by circuit design component 111. In the depicted embodiment, database 118 resides on circuit design server 110. In another embodiment, database 118 may reside elsewhere within wire lineend optimization data processing environment, provided that circuit design component 111 has access to database 118. A database is an organized collection of data. Database 118 can be implemented with any type of storage device capable of storing data and configuration files that can be accessed and utilized by circuit design server 110, such as a database server, a hard disk drive, or a flash memory. Database 118 uses one or more of a plurality of techniques known in the art to store a plurality of information of a user, such as a preference, a routine, etc. For example, database 118 may store information about line end cut locations, few threshold distances, and interconnect locations.

Figure 1B:
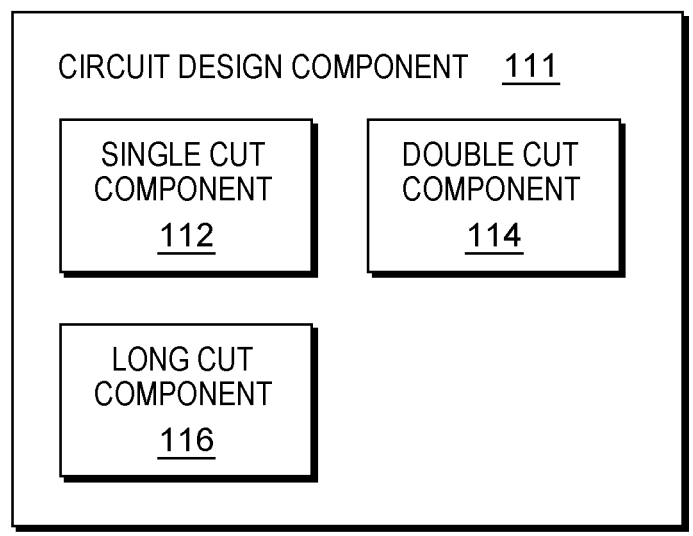
FIG. 1B is a functional block diagram depicting a circuit design component 111 in accordance with an embodiment of the present invention.

FIG. 1B is a functional block diagram depicting a circuit design component comprising single cut component 112, double cut component 114 and long cut component 116.

Single cut component 112 of an embodiment of the present invention provides the capability for a single cut shift methodology to be applied to the circuit technology (see FIGS. 2B and 2C). A polygon is a layer consisting of a pre-determined patterns with a pre-defined number of vertices. A lineend is the end point of the target "line" that can be defined by a cut. An interconnect is conductor (typically metal) line connecting elements of an integrated circuit. A via is a vertical electrical connection. An "untouched lineend" means that a cut defining a lineend has not been optimized (has not shifted by the optimization distance of x). A 'first interconnect" is an interconnect that touches the cut shape defining the lineend of a given interconnect. A "second interconnect" is an interconnect that touches the cut-shape defining the further end of a first interconnect. In an embodiment, for a single cut for a lineend, single cut component 112 selects a new polygon lineend. Single cut component 112 determines or checking whether there are any vias on the first interconnect. If there are no vias on the first interconnect then single cut component 112 determines or checks whether the next cut is beyond a threshold and untouched. A threshold distance is a pre-determined distance defined during the manufacturing process. However, if there are vias on the first interconnect then single cut component 112 determines or checks if there are any vias beyond a threshold distance. If there is a next cut beyond a threshold and untouched then single cut component 112 shifts the first cut by the preset distance of x that is optimal for the manufacturing process.

Figure 3A:
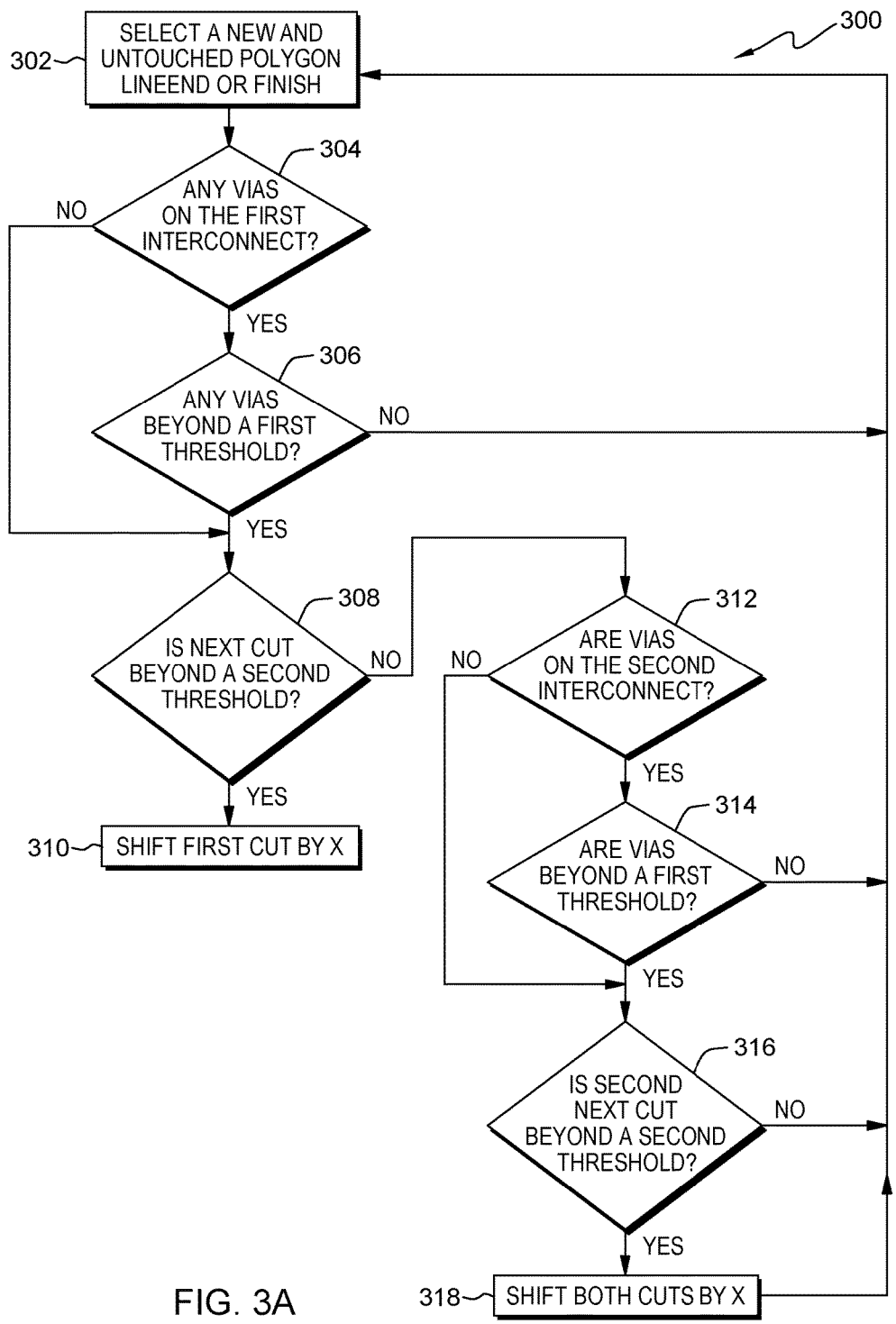
FIG. 3A is a flowchart depicting an alternative embodiment of operational steps of double cut component 114 of FIG. 1B for wire lineend optimization 300, in accordance with an alternative embodiment of the present invention.
Figure 3B:
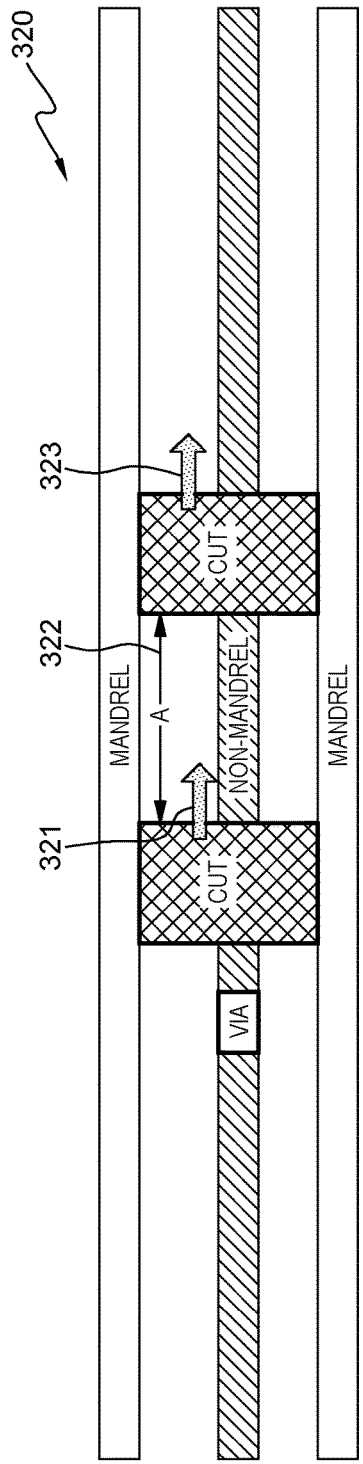
FIG. 3B-C is a graphical example, illustrating the operational steps of a method for double cut component 114 of FIG. 1B for a wire lineend optimization in accordance with an embodiment of the present invention.
Figure 3C:
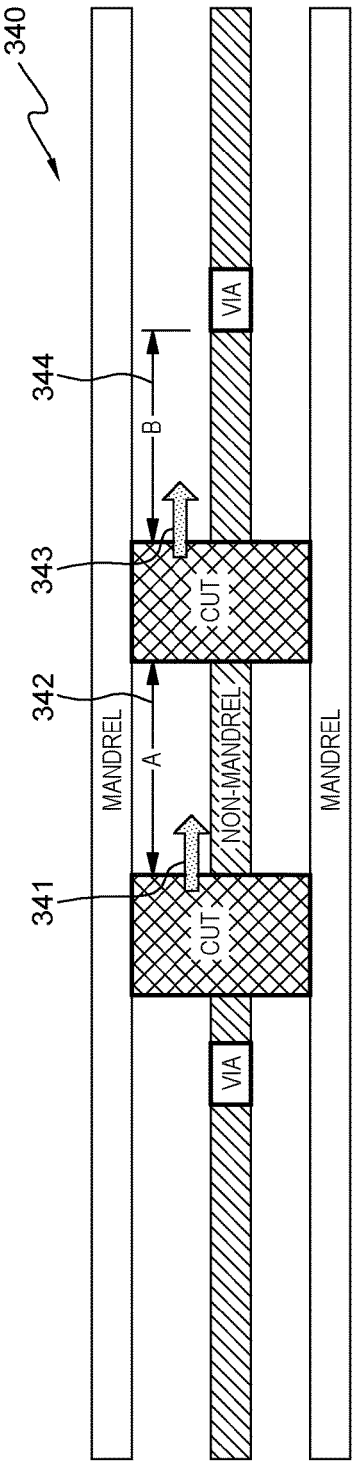

Double cut component 114 of the present invention enables further optimization of manufacturing technology by employing a two shift cut methodology (see FIGS. 3B and 3C). One cut and double cut optimizations are alternative flows and either one is usually picked and implemented throughout the circuit. The former is computationally less expensive. An "untouched lineend" means that a cut defining a lineend has not been optimized (has not shifted by the optimization distance, x). In an embodiment, after selecting a new and untouched polygon lineend, double cut component 114 determines or checks whether there are any vias on the first interconnect. If there are no vias on the first interconnect then double cut component 114 determines or checks whether the next cut is beyond a second threshold distance. After determining, that there is a cut beyond a second threshold distance, double cut component 114 shifts the first cut by x. Otherwise, double cut component 114 determines or checks whether there are any vias on the second interconnect. If there are no vias on the second interconnect then double cut component 114 determines or checks whether there is a second next cut beyond a second threshold. If there is a second next cut beyond a second threshold then double shift component 112 shift both cuts by a distance of x.

Figure 4A:
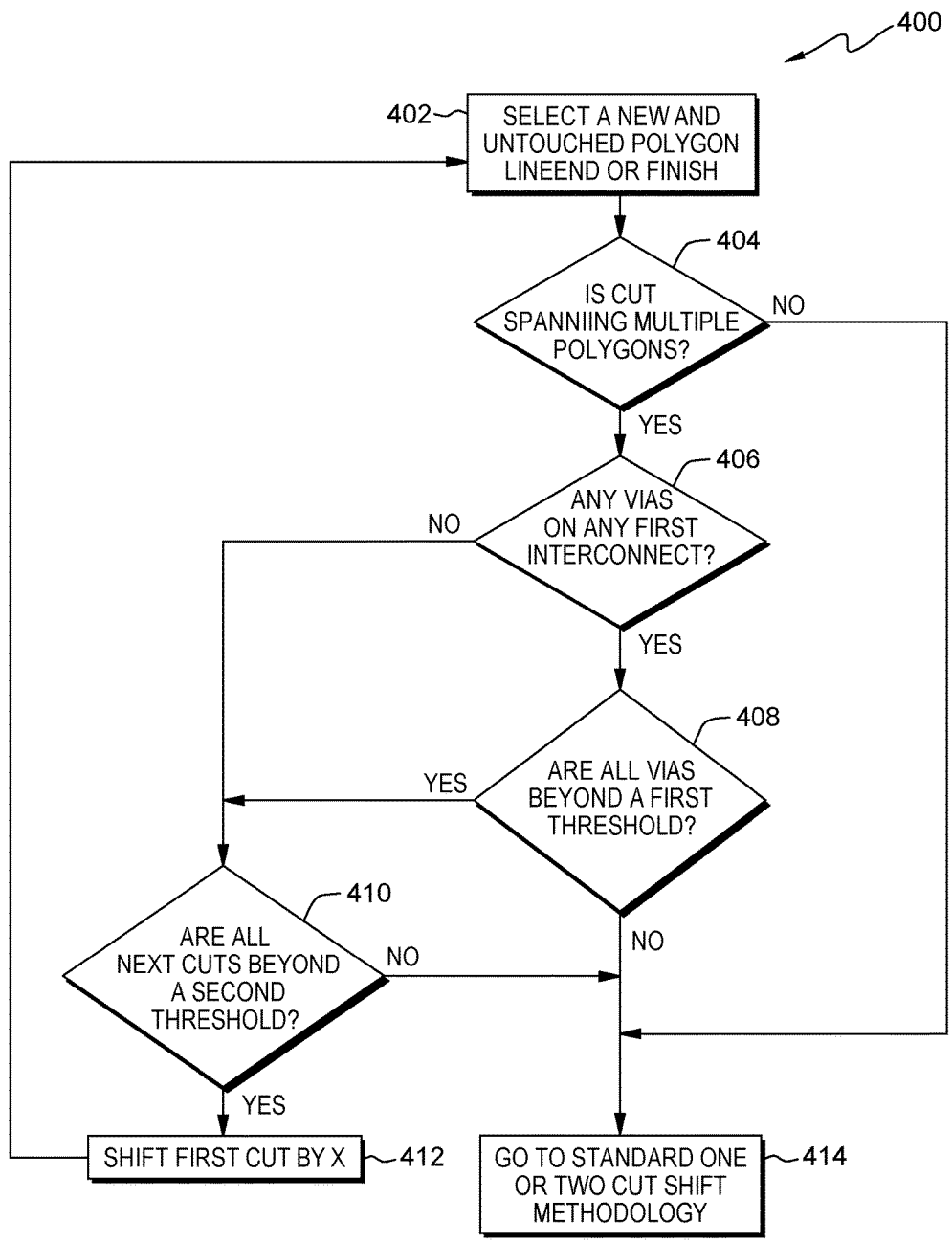
FIG. 4A is a flowchart depicting an alternative embodiment of operational steps of long cut component 116 of FIG. 1B for wire lineend optimization 400, in accordance with an alternative embodiment of the present invention.
Figure 4B:
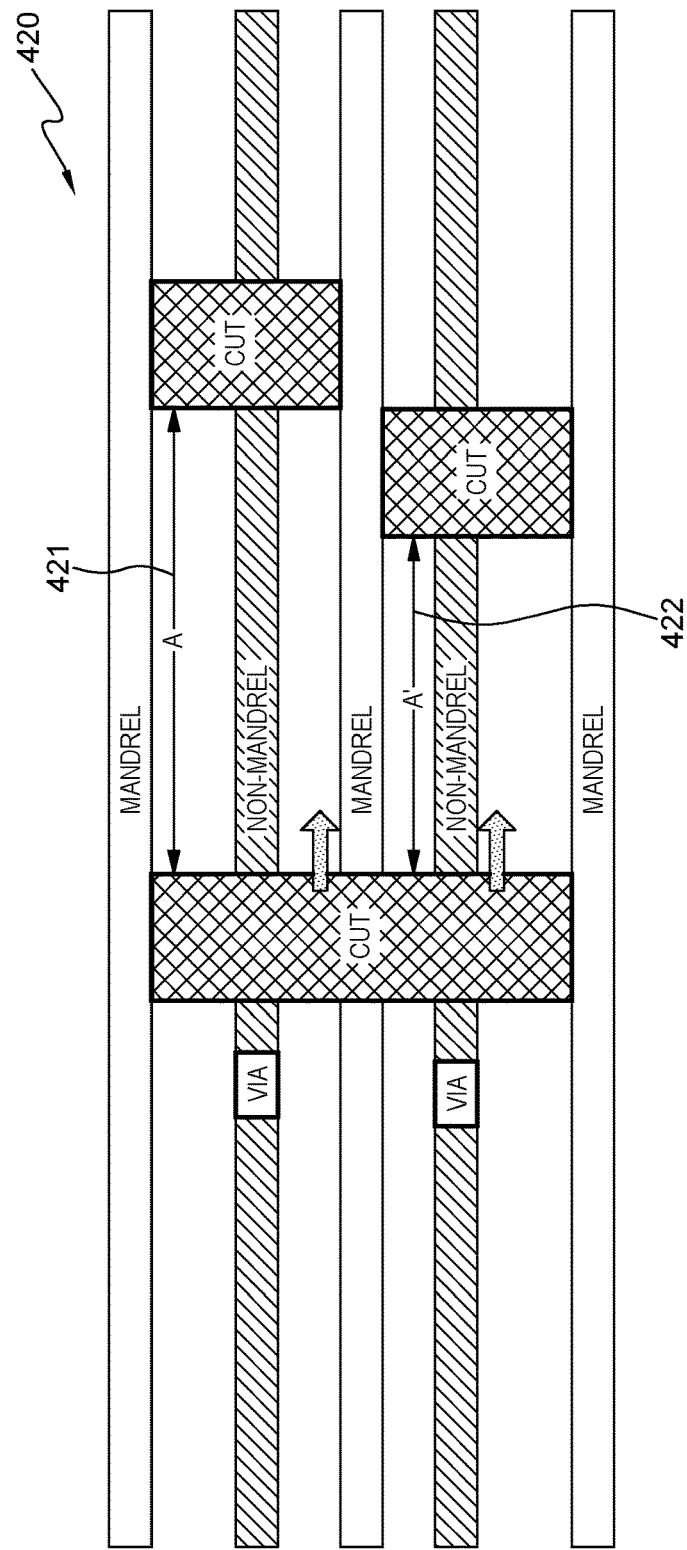
FIG. 4B is a graphical example, illustrating the operational steps of a method for a long cut component 116 of FIG. 1B for wire lineend optimization in accordance with an embodiment of the present invention.

Long cut component 116 of the present invention enables further optimization of manufacturing technology by allowing the use of a multiple cut spanning several lineends at once or a "long cut" shift (see FIG. 4B). A 'first interconnect" is an interconnect that touches the cut shape defining the lineend of a given interconnect. A "second interconnect" is an interconnect that touches the cutshape defining the further end of a first interconnect. An "untouched lineend" means that a cut defining a lineend has not been optimized (has not shifted by the optimization distance of x). In an embodiment, long cut component 116 selects a new and untouched polygon. Long cut component 116 determines or checks whether a cut is spanning multiple polygons. If the cut is spanning multiple polygons then long cut component 116 determines or checks whether there are any vias on any first interconnect. If there are no vias on the first interconnect then long cut component 116 determines or checks whether all of the next cuts are beyond a second threshold. However, if there are vias on the first interconnect then long cut component 116 determines or checks whether all the vias are beyond a first threshold. If all the vias are not beyond a first threshold then long cut component 116 can follow the either the single cut component 112 or the double cut component 114 methodology. If the entire next cuts are beyond a second threshold then long cut component 116 shifts the cut by distance of x. However, if any next cuts are not beyond a second threshold then long cut component 116 can follow the either the single cut component 112 or the double cut component 114 methodology. It is noted that long cut component 116 must have all first interconnects on the same side. For example, referring to FIG. 4B, the long cut shift must be on the right or the left of the "non mandrel cut" block.

Figure 2A:
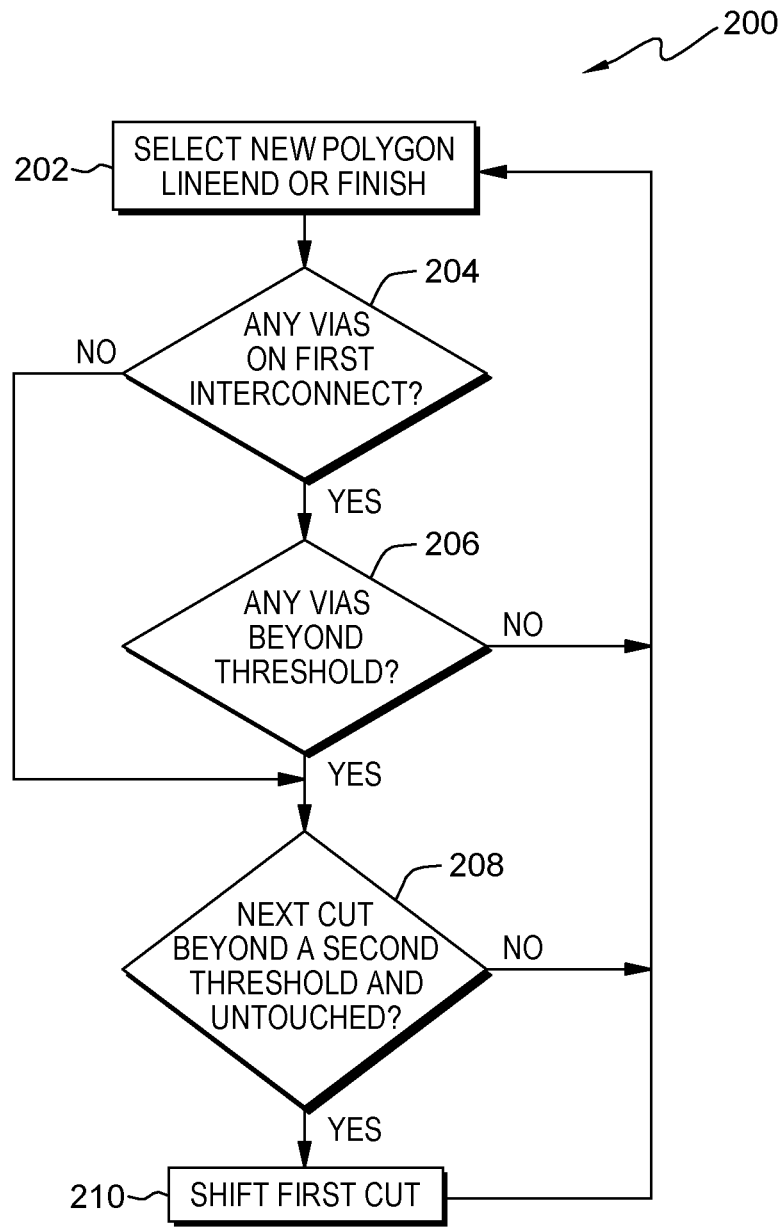
FIG. 2A is a flowchart depicting operational steps of single cut component 112 of FIG. 1B for wire lineend optimization 200, in accordance with an embodiment of the present invention.

FIG. 2A is a flowchart 200 depicting operational steps of single cut component 112 of FIG. 1B, utilizing "one cut" method, on circuit design server 110 within wire lineend optimization data processing environment of FIG. 1A, in accordance with an embodiment of the present invention.

Single cut component 112 selects a new polygon lineend (step 202). In an embodiment, single cut component 112 selects a polygon to determine the first cut.

Single cut component 112 determines or checks whether any vias exist on the first interconnect (decision block 204). In an embodiment, single cut component 112 determines or checks whether there are any vias on the first interconnect.

If single cut component 112 determines or checks that there are vias on the first interconnect ("yes" branch, decision block 204), then program proceeds to the determine whether there are any vias beyond a threshold (decision block 206).

If single cut component 112 determines or checks that there are no vias on the first interconnect ("no" branch, decision block 204), then program proceeds to the determine whether the next cut is beyond a threshold and untouched (decision block 208).

Single cut component 112 determines or checks whether there are any vias beyond a threshold (decision block 206). In an embodiment, single cut component 112 determines or checks whether there are any vias beyond a threshold distance on the lineend.

If single cut component 112 determines or checks that there are vias beyond a threshold ("yes" branch, decision block 206), then program proceeds to the determine whether there is a next cut beyond a threshold and untouched (decision block 208).

If single cut component 112 determines or checks that there are no vias beyond a threshold ("no" branch, decision block 206), then program proceeds to re-select a new polygon lineend (step 202).

Single cut component 112 determines or checks whether the next cut is beyond a threshold and untouched (decision block 208). In an embodiment, single cut component 112 determines or checks whether the next cut is beyond a threshold distance and untouched.

If single cut component 112 determines or checks that there is a next cut beyond a threshold and untouched ("yes" branch, decision block 208), then program proceeds to shift the first cut (step 210).

If single cut component 112 determines or checks that there is not a next cut beyond a threshold and untouched ("no" branch, decision block 208), then program proceeds to re-select a new polygon (step 202).

Single cut component 112 shifts the first cut (step 210). In an embodiment, single cut component 112 shifts the first cut by the threshold distance x. This results in an optimized circuit layout for a given polygon.

In one embodiment, the operational step of single cut component 112 follows the decision path of "NO-YES" to determine the cut. The "NO-YES" path is a "NO" to decision block 204 and a "YES" to decision block 208. In another embodiment, single cut component 112 follows the decision path of "YES-YES-YES" to determine the cut. The "YES-YES-YES" path is a "YES" to decision block 204, a "YES" to decision block 206 and a "YES" to decision block 208. Both embodiments are illustrated further in FIG. 2B and FIG. 2C. FIG. 2B, "NO-YES" path 220 shows the shift of the first cut by a threshold distance of x. This is the length of shift arrow 222. It is noted that the threshold distance is not shown in the figures. The distance of A 221 is what is measured in the given layout. For example, the second threshold distance is compared against a measured cut to a cut space, such as A 221.

FIG. 2C, "YES-YES-YES" path 240 shows the shift of the first cut by a threshold distance of x. This is the length of shift arrow 242. As depicted in the alternate embodiments, the distance of A 221 of "NO-YES" path 220 of FIG. 2B and the distance of A 241 associated with "YES-YES-YES" path 240 are not the same length based on the decision path. Generally, the distance of A (e.g., A 221 and A 241) and B (e.g., B 243) refers to a distance compared against a second threshold in FIGS. 2B and 2C.

FIG. 2B is a graphical example, illustrating the operational steps of single cut component 112 of FIG. 1B utilizing the "NO-YES" embodiment from FIG. 2A on a server computer within the wire lineend optimization data processing environment. In the depicted embodiment, no via means the line defined by the rightmost non-mandrel is a dummy structure and distance A 221 is large enough (beyond a pre-determined threshold).

FIG. 2C is a graphical example, illustrating the result of the operational steps of the single cut component 112 of FIG. 1B utilizing the "YES-YES-YES" embodiment from FIG. 2A on a server computer within the wire lineend optimization data processing environment. In the depicted embodiment, there is a via but it is far away as measured by distance A 241 (being above a pre-determined threshold).

FIG. 3A is a flowchart 300 depicting operational steps of double cut component 114 of FIG. 1B, utilizing "two cut" method, on circuit design server 110 within wire lineend optimization data processing environment of FIG. 1A, in accordance with an embodiment of the present invention.

Double cut component 114 selects a new and untouched polygon lineend or finish (step 302). In an embodiment, double cut component 114 selects a polygon to begin the analysis for circuit optimization.

Double cut component 114 determines or checks whether there are any vias on the first interconnect (decision block 304). In an embodiment, double cut component 114 determines or checks whether there are any vias on the first interconnect.

If double cut component 114 determines or checks that there are vias on the first interconnect ("yes" branch, decision block 304), then double cut component 114 determines or checks if there are any vias beyond a first threshold (decision block 306). If double cut component 114 determines or checks that there is no via on the first interconnect ("no" branch, decision block 304), then double cut component 114 proceeds to determine whether there is a next cut beyond a second threshold (decision block 308).

Double cut component 114 determines or checks whether there are any vias beyond a first threshold (decision block 306). In an embodiment, double cut component 114 determines or checks whether there are any vias beyond a first threshold distance on the lineend.

If double cut component 114 determines or checks that there is a via beyond a first threshold ("yes" branch, decision block 306), then program proceeds to the determine whether there is a next cut beyond a second threshold (decision block 308). If double cut component 114 determines or checks that there are no vias beyond a first threshold ("no" branch, decision block 306), then double cut component 114 proceeds to re-select a new polygon (step 302). If there are no polygons left to pick then the methodology finishes.

Double cut component 114 determines or checks whether the next cut is beyond a second threshold (decision block 308).

If double cut component 114 determines or checks that there is a next cut beyond a first threshold ("yes" branch, decision block 308), then program proceeds to shift the first cut by a distance of x (step 310). If double cut component 114 determines or checks that there is no next cut beyond a second threshold ("no" branch, decision block 308), then program proceeds to determine whether there are any vias on the second interconnect (decision block 312).

Double cut component 114 determines or checks whether there are any vias on the second interconnect (decision block 312). In an embodiment, double cut component 114 determines or checks whether there are any vias on the second interconnect.

If double cut component 114 determines or checks that there are vias on the second interconnect ("yes" branch, decision block 312), then double cut component 114 determines or checks whether there are any vias beyond the first threshold (decision block 314). If double cut component 114 determines or checks that there are no vias on the second interconnect ("no" branch, decision block 312), then double cut component 114 proceeds to determine whether there is a second next cut beyond a second threshold (decision block 316).

Double cut component 114 determines or checks whether there are any vias beyond a first threshold (decision block 314). In an embodiment, double cut component 114 determines or checks whether there are any vias beyond a first threshold distance on the lineend.

If double cut component 114 determines or checks that there is a via beyond a first threshold ("yes" branch, decision block 314), then program proceeds to the determine whether there is a second next cut beyond a second threshold (decision block 316). If double cut component 114 determines or checks that there is no via beyond a first threshold ("no" branch, decision block 314), then double cut component 114 proceeds to re-select a new polygon (step 302).

Double cut component 114 determines or checks whether the second next cut is beyond a second threshold (decision block 316).

If double cut component 114 determines or checks that there is a second next cut beyond a second threshold ("yes" branch, decision block 316), then double cut component 114 shift both cuts by a distance of x (step 318). If double cut component 114 determines or checks that there is not a second next cut beyond a second threshold ("no" branch, decision block 316), then double cut component 114 proceeds to re-select a new polygon (step 302).

In one embodiment, double cut component 114 follows the decision path of "NO-YES" to determine the cut. "NO-YES" path is a "NO" to decision block 312 and a "YES" to decision block 316. In another embodiment, single cut component 112 follows the decision path of "YES-YES-YES" to determine the cut. "YES-YES-YES" path is a "YES" to decision block 312, a "YES" to decision block 314 and a "YES" to decision block 316. Both embodiments are illustrated further in FIG. 3B and FIG. 3C. FIG. 3B, "NO-YES" path 320 shows the shift of the first cut by a pre-determined threshold distance of x. This shift distance is indicated by shift arrow 321. The second shift for the second cut is indicated by shift arrow 323. It is noted that the pre-determined threshold distance is not shown in the figures. The distance of A 322 is what is measured in the given layout. For example, the second pre-determined threshold distance is compared against a measured cut to cut space, such as A 322.

FIG. 3C, "YES-YES-YES" path 340 shows the shift of the first cut by a threshold distance of x. The distance of B 344 and the distance of A 342 are measured in a given layout. For example, (referring to FIG. 3C) the first cut is shifted by shift arrow 341 and second cut is shifted by shift arrow 343. The first pre-determined threshold is compared against a measured cut to via space (e.g., B 344) and the second pre-determined threshold is compared against a measured cut to cut space (e.g., A 342).

As depicted in the alternate embodiments, the distance of A 322 of "NO-YES" path 320 and the distance of A 342 and the distance of B 344 of "YES-YES-YES" path 340 are not the same length based on the decision path. Generally, the distances, A (e.g., A 322 and A 342) and B (e.g., B 344) are compared with the second and first pre-determined thresholds, respectively.

FIG. 3B is a graphical example, illustrating the result of the operational steps of the double cut methodology utilizing the "NO-YES" embodiment from FIG. 3A. In the depicted embodiment, no via means the line defined by the rightmost non-mandrel is a dummy structure and the distance of A (e.g., A 322) below is large enough (beyond a second pre-determined threshold).

FIG. 3C is a graphical example, illustrating the result of the operational steps of the double cut methodology utilizing the "YES-YES-YES" embodiment from FIG. 3A. In the depicted embodiment, there is a via but it is far away as measured by the distance of B (e.g., B 344) being above a first pre-determined threshold.

FIG. 4A is flowchart 400 depicting operational steps of long cut component 116, utilizing "long cut" method, on circuit design server 110 within wire lineend optimization data processing environment of FIG. 1A, in accordance with an embodiment of the present invention.

Long cut component 116 selects a new and untouched polygon lineend or finish (step 402). In an embodiment, long cut component 116 selects a polygon to begin the analysis for circuit optimization.

Long cut component 116 determines or checks whether there is a cut spanning multiple polygons (decision block 404). In an embodiment, long cut component 116 determines or checks whether there is a cut spanning multiple polygons.

If long cut component 116 determines or checks that there is a cut spanning multiple polygons ("yes" branch, decision block 404), then long cut component 116 determines or checks if there are any vias beyond the first interconnect (decision block 406). If long cut component 116 determines or checks that there is no cut spanning multiple polygons ("no" branch, decision block 404), then long cut component 116 proceeds to the standard one cut or double cut methodology (step 414).

Long cut component 116 determines or checks whether there are any vias on any first interconnect (decision block 406). In an embodiment, long cut component 116 determines or checks whether there are any vias on any first interconnect.

If long cut component 116 determines or checks that there are no vias on any first interconnect ("no" branch, decision block 406), then long cut component 116 determines or checks whether all next cuts are beyond a second threshold (decision block 410). If long cut component 116 determines or checks that there are vias on any first interconnect ("yes" branch, decision block 406), then long cut component 116 proceeds to determine whether all vias are beyond a first threshold (decision block 408).

Long cut component 116 determines or checks whether all vias are beyond a first threshold (decision block 408). In an embodiment, long cut component 116 determines or checks whether all vias are beyond a first threshold distance on the lineend.

If long cut component 116 determines or checks that all vias are beyond a first threshold ("yes" branch, decision block 408), then program proceeds to the determine whether all next cuts are beyond a second threshold (decision block 410). If long cut component 116 determines or checks that all vias are not beyond a first threshold ("no" branch, decision block 408), then long cut component 116 proceeds to the standard one cut or double cut methodology (step 414).

Long cut component 116 determines or checks whether all next cuts are beyond a second threshold (decision block 410). In an embodiment, long cut component 116 determines or checks whether the long cut is beyond a second threshold.

If long cut component 116 determines or checks that all next cuts are beyond a second threshold ("yes" branch, decision block 410), then long cut component 116 can shift all next cuts by distance of x (step 412). If long cut component 116 determines or checks that there are no next cuts beyond a second threshold ("no" branch, decision block 410), then long cut component 116 proceeds to the standard one cut or double cut methodology (step 414).

FIG. 4B is a graphical example, illustrating the general result of operational steps of the long cut methodology in accordance with an embodiment of the present invention. No via means that the line defined by the middle non-mandrel is a dummy structure and the distance of A 421 and the distance of A' 422 is large enough (beyond a pre-determined threshold). It is noted that the threshold distance is not shown in FIG. 4B.

Figure 5:
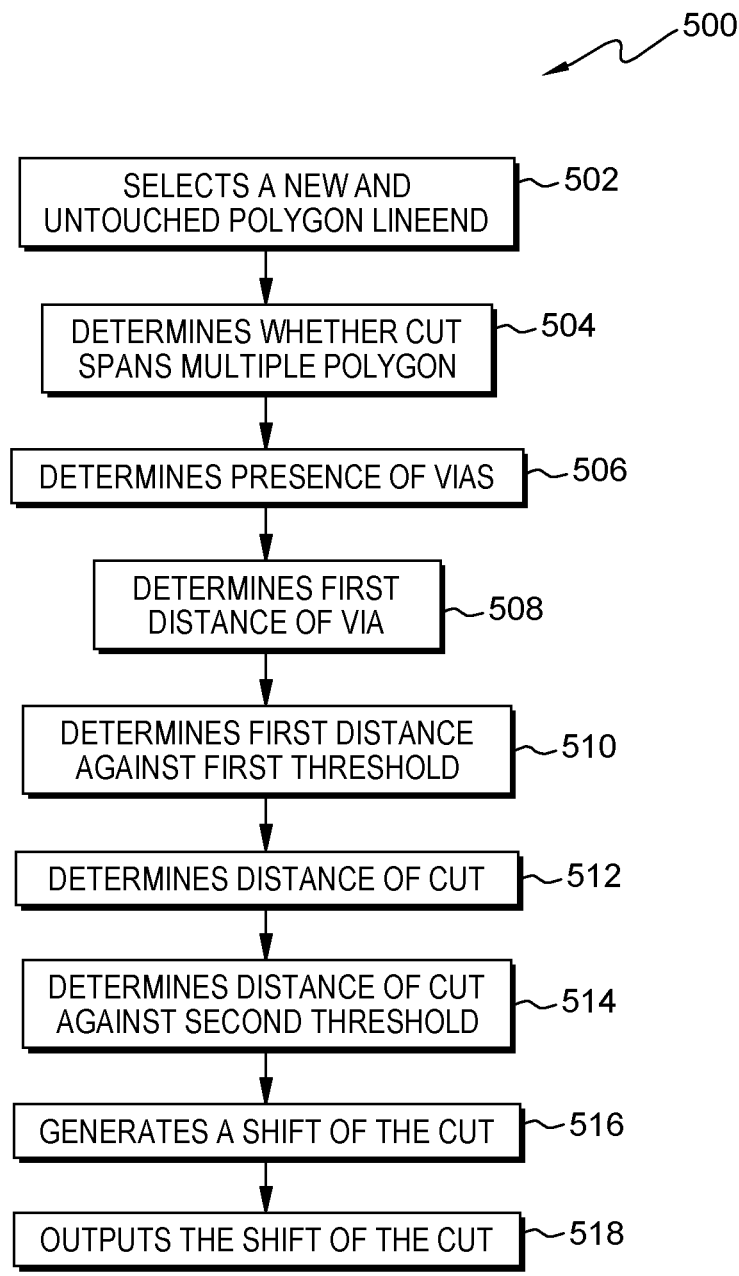
FIG. 5 is a flowchart depicting an embodiment of operational steps of circuit design component 111 of FIG. 1B for wire lineend optimization 500, in accordance with the an embodiment of the present invention.

FIG. 5 is a flowchart depicting an embodiment of operational steps of circuit design component 111 of FIG. 1B for wire lineend optimization 500, in accordance with an embodiment of the present invention.

Circuit design component 111 selects a new and untouched polygon lineend or finish (step 502). In an embodiment, circuit design component 111 selects a polygon to begin the analysis for circuit optimization. For example, a selected polygon is identified with a lineend.

Circuit design component 111 determines whether the cut spans multiple polygons (step 504). In an embodiment, circuit design component 111 determines whether the cut spans multiple polygons.

Circuit design component 111 determines the presence of vias (step 506). In an embodiment, circuit design component 111 determines the presence of vias. For example, the presence of vias are check on a nearby polygon beyond the first cut.

Circuit design component 111 determines the distance of vias (step 508). In an embodiment, circuit design component 111 determines the distance of a first via from the first cut. For example, the distance of the first via to the location of the first cut is calculated by circuit design component 111.

Circuit design component 111 determines the first distance against a threshold (step 510). In an embodiment, circuit design component 111 determines the distance of vias against a threshold. For example, the distance of a first via to the first cut is checked against a first pre-determined threshold.

Circuit design component 111 determines the second distance of cuts (step 512). In an embodiment, circuit design component 111 determines the distance of a first cut from the second cut. For example, the distance of the first via to the location of the second cut is calculated by circuit design component 111.

Circuit design component 111 determines the second distance against a second threshold (step 514). In an embodiment, circuit design component 111 determines the distance of vias against a second threshold. For example, the distance of a first via to the second cut is checked against a second pre-determined threshold.

Circuit design component 111 generates a shift of the cut (step 516). In an embodiment, circuit design component 111 generates a shift of the cut.

Circuit design component 111 outputs the shift of the cut (step 518). In an embodiment, circuit design component 111 outputs a distance value for moving the cut. For example, the output distance may be used as a new design to manufacture semiconductor chips.

Figure 6:
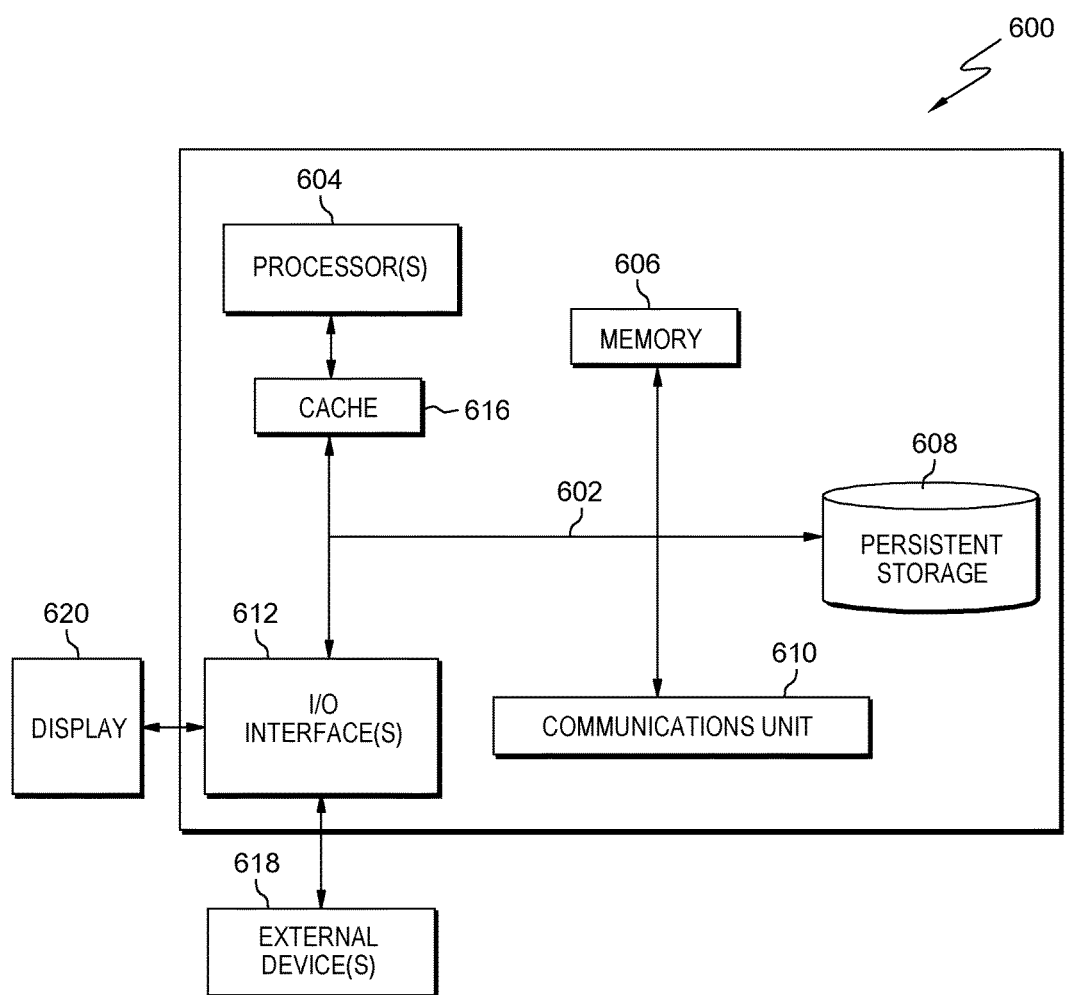
FIG. 6 depicts a block diagram of components of the server computer executing the program within the circuit design data processing environment of FIG. 1A, in accordance with an embodiment of the present invention.

FIG. 6 depicts a block diagram of components of circuit design server 110 within wire lineend optimization data processing environment of FIG. 1A, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

Circuit design server 110 can include processor(s) 604, cache 616, memory 606, persistent storage 608, communications unit 610, input/output (I/O) interface(s) 612 and communications fabric 602. Communications fabric 602 provides communications between cache 614, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processor(s) 604 by holding recently accessed data, and data near recently accessed data, from memory 606.

Program instructions and data used to practice embodiments of the present invention, e.g., circuit design component 111 and database 118, can be stored in persistent storage 608 for execution and/or access by one or more of the respective processor(s) 604 of circuit design server 110 via memory 606. In this embodiment, persistent storage 608 includes a magnetic hard disk drive. Alternatively, or in addition to a magnetic hard disk drive, persistent storage 608 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of client computing device 120. In these examples, communications unit 610 includes one or more network interface cards. Communications unit 610 may provide communications through the use of either or both physical and wireless communications links. Circuit design component 111 and database 118 may be downloaded to persistent storage 608 of circuit design server 110 through communications unit 610.

I/O interface(s) 612 allows for input and output of data with other devices that may be connected to circuit design server 110. For example, I/O interface(s) 612 may provide a connection to external device(s) 618 such as a keyboard, a keypad, a touch screen, a microphone, a digital camera, and/or some other suitable input device. External device(s) 618 can also include portable computer readable storage media such as, for example, thumb drives, portable optical or magnetic disks, and memory cards. Software and data used to practice embodiments of the present invention, e.g., circuit design component 111 and database 118 on circuit design server 110, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor or the lenses of a head mounted display. Display 620 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for shifting a cut associated with a lineend of an interconnect in an advanced manufacturing system, the method comprising:
   selecting, by a circuit design component, one or more polygons associated with a lineend of an interconnect;
   determining, by the circuit design component, whether a first cut is spanning the one or more polygons;
   determining, by the circuit design component, a presence of a first via on a first interconnect;
   determining, by the circuit design component, a first distance of the first via to the first cut;
   determining, by the circuit design component, whether the first distance is greater than a first pre-determined threshold;
   determining, by the circuit design component, a second distance of the first cut to a second cut;

determining, by the circuit design component, whether the second distance is greater than a second pre-determined threshold;
generating, by the circuit design component, a shift associated with the first cut; and
outputting, by the circuit design component, the shift for moving the first cut.

2. The method of claim 1, wherein the determining whether the first cut is spanning the one or more polygons comprises:
identifying, by the circuit design component, a location of the first cut;
identifying, by the circuit design component, a location of one or more lineends; and
determining, by the circuit design component, whether the first cut intersects the one or more lineends.

3. The method of claim 1, further comprising:
determining, by the circuit design component, whether there is a second via on a second interconnect;
determining, by the circuit design component, whether the second distance is greater than the second pre-determined threshold;
generating, by the circuit design component, a shift associated with the second cut; and
outputting, by the circuit design component, the shift for moving the second cut.

4. The method of claim 1, further comprises:
determining, by the circuit design component, whether there is a second via on a second interconnect;
determining, by the circuit design component, a third distance of the second via to the second cut;
determining, by the circuit design component, whether the third distance is greater than the first pre-determined threshold;
determining, by the circuit design component, whether the second distance is greater than the second pre-determined threshold;
generating, by the circuit design component, a shift associated with the second cut; and
outputting, by the circuit design component, the shift for moving the second cut.

5. The method of claim 4, wherein the outputting the shift for moving the first cut comprises:
creating, by the circuit design component, a cut mask that is used to manufacture a semiconductor chip based on the shift for moving the first cut.

6. The method of claim 1, wherein the determining the first distance of the first via to the first cut comprises:
identifying, by the circuit design component, a location of the first via;
identifying, by the circuit design component, a location of the first cut; and
calculating, by the circuit design component, the first distance of the first via to the first cut.

7. The method of claim 1, wherein the determining the second distance of the first cut to the second cut comprises:
identifying, by the circuit design component, a location of the first cut;
identifying, by the circuit design component, a location of the second cut; and
calculating, by the circuit design component, the second distance of the first cut to the second cut.

8. A computer program product for shifting a cut associated with a lineend of an interconnect in an advanced manufacturing system, the computer program product comprising:
one or more non-transitory computer readable storage media and program instructions stored thereon program instructions which, when executed by one or more computer processors, cause the one or more processors to perform actions comprising:
selecting one or more polygons associated with a lineend of an interconnect;
determining whether a first cut is spanning the one or more polygons;
determining a presence of a first via on a first interconnect;
determining a first distance of the first via to the first cut;
determining whether the first distance is greater than a first pre-determined threshold;
determining a second distance of the first cut to a second cut;
determining whether the second distance is greater than a second pre-determined threshold;
generating a shift associated with the first cut; and
outputting the shift for moving the first cut.

9. The computer program product of claim 8, wherein the determining whether the first cut is spanning the one or more polygons comprises:
identifying a location of the first cut;
identifying a location of one or more lineends; and
determining whether the first cut intersects the one or more lineends.

10. The computer program product of claim 8, the instructions further cause the one or more processors to perform actions comprising:
determining whether there is a second via on a second interconnect;
determining whether the second distance is greater than the second pre-determined threshold;
generating a shift associated with the second cut; and
outputting the shift for moving the second cut.

11. The computer program product of 8, the instructions further cause the one or more processors to perform actions comprising:
determining whether there is a second via on a second interconnect;
determining a third distance of the second via to the second cut;
determining whether the third distance is greater than the first pre-determined threshold;
determining whether the second distance is greater than the second pre-determined threshold;
generating a shift associated with the second cut; and
outputting the shift for moving the second cut.

12. The computer program product of claim 11, wherein the outputting the shift for moving the first cut comprises:
creating a cut mask that is used to manufacture a semiconductor chip based on the shift for moving the first cut.

13. The computer program product of claim 8, wherein the determining the first distance of the first via to the first cut comprises:
identifying a location of the first via;
identifying a location of the first cut; and
calculating the distance of the first via to the first cut.

14. The computer program product of claim 8, wherein the determining the second distance of the first cut to the second cut comprises:
identifying a location of the first cut;
identifying a location of the second cut; and calculating the second distance of the first cut to the second cut.

15. A computer system for shifting a cut associated with a lineend of an interconnect in an advanced manufacturing system, the computer system comprising:
one or more computer processors;
one or more computer non-transitory readable storage media;
program instructions stored on the one or more non-transitory computer readable storage media for causing the one or more computer processors to execute actions comprising:
select one or more polygons associated with a lineend of an interconnect;
determining whether a first cut is spanning the one or more polygons;
determining a presence of a first via on a first interconnect;
determining a first distance of the first via to the first cut;
determining whether the first distance is greater than a first pre-determined threshold;
determining a second distance of the first cut to a second cut;
determining whether the second distance is greater than the second pre-determined threshold;
generating a shift associated with the first cut; and
outputting the shift for moving the first cut.

16. The computer system of claim 15, wherein the determining whether the first cut is spanning the one or more polygons comprises:
identifying a location of the first cut;
identifying a location of one or more lineends; and
determining whether the first cut intersects the one or more lineends.

17. The computer system of claim 15, the instructions further cause the one or more processors to perform actions comprising:
determining whether there is a second via on a second interconnect;
determining whether the second distance is greater than the second pre-determined threshold;
generating a shift associated with the second cut; and
outputting the shift for moving the second cut.

18. The computer system of 15, the instructions further cause the one or more processors to perform actions comprising:
determining whether there is a second via on a second interconnect;
determining a third distance of the second via to the second cut;
determining whether the third distance is greater than the first pre-determined threshold;
determining whether the second distance is greater than the second pre-determined threshold;
generating a shift associated with the second cut; and
outputting the shift for moving the second cut.

19. The computer system of claim 15, wherein the determining the first distance of the first via to the first cut comprises:
identifying a location of the first via;
identifying a location of the first cut; and
calculating the distance of the first via to the first cut.

20. The computer system of claim 15, wherein the outputting the shift for moving the first cut comprises:
creating a cut mask that is used to manufacture a semiconductor chip based on the shift for moving the first cut.

* * * * *